(12) United States Patent
Lane, Jr. et al.

(10) Patent No.: US 8,196,961 B2
(45) Date of Patent: Jun. 12, 2012

(54) STAMPED HOUSING LINEAR PRETENSIONER

(75) Inventors: Wendell C. Lane, Jr., Romeo, MI (US); David J. Dziuda, Rochester Hills, MI (US); Randy G. Handrinos, Troy, MI (US)

(73) Assignee: Autoliv ASP, Inc., Ogden, UT (US)

( * ) Notice: Subject to any disclaimer, the term of this patent is extended or adjusted under 35 U.S.C. 154(b) by 168 days.

(21) Appl. No.: 12/723,151

(22) Filed: Mar. 12, 2010

(65) Prior Publication Data
US 2011/0221178 A1 Sep. 15, 2011

(51) Int. Cl.
*B60R 22/36* (2006.01)
(52) U.S. Cl. ..................................... 280/806
(58) Field of Classification Search .............. 280/806, 280/807; 242/374; 297/470, 480
See application file for complete search history.

(56) References Cited

U.S. PATENT DOCUMENTS

| 6,068,664 | A | 5/2000 | Meyer et al. |
| 7,188,868 | B2 * | 3/2007 | Yamaguchi ............... 280/806 |

FOREIGN PATENT DOCUMENTS

| DE | 103 08 121 B3 | 10/2004 |
| EP | 0 685 371 B1 | 7/1997 |
| JP | 2006290335 A | * 10/2006 |

* cited by examiner

*Primary Examiner* — Faye M. Fleming
(74) *Attorney, Agent, or Firm* — Sally J. Brown; Brinks, Hofer, Gilson & Lione

(57) ABSTRACT

A linear pretensioner device for motor vehicle belt restraint systems. In one embodiment, the linear pretensioner is formed by a pair of stamped sheet metal housing components joined along a plane which is parallel to the longitudinal axis of the internal piston bore. After the sheet metal housing half members are formed, assembly proceeds by loading the elements of a cable assembly into one of the housing half members, placing the second housing half member over the first and fastening them together by spot welds or other fastening processes. Alternate embodiments include a one-piece housing component deformed to form the housing, and a variety of means for connecting together the housing members or sections. The invention is also related to methods of assembling various designs of pretensioners.

51 Claims, 7 Drawing Sheets

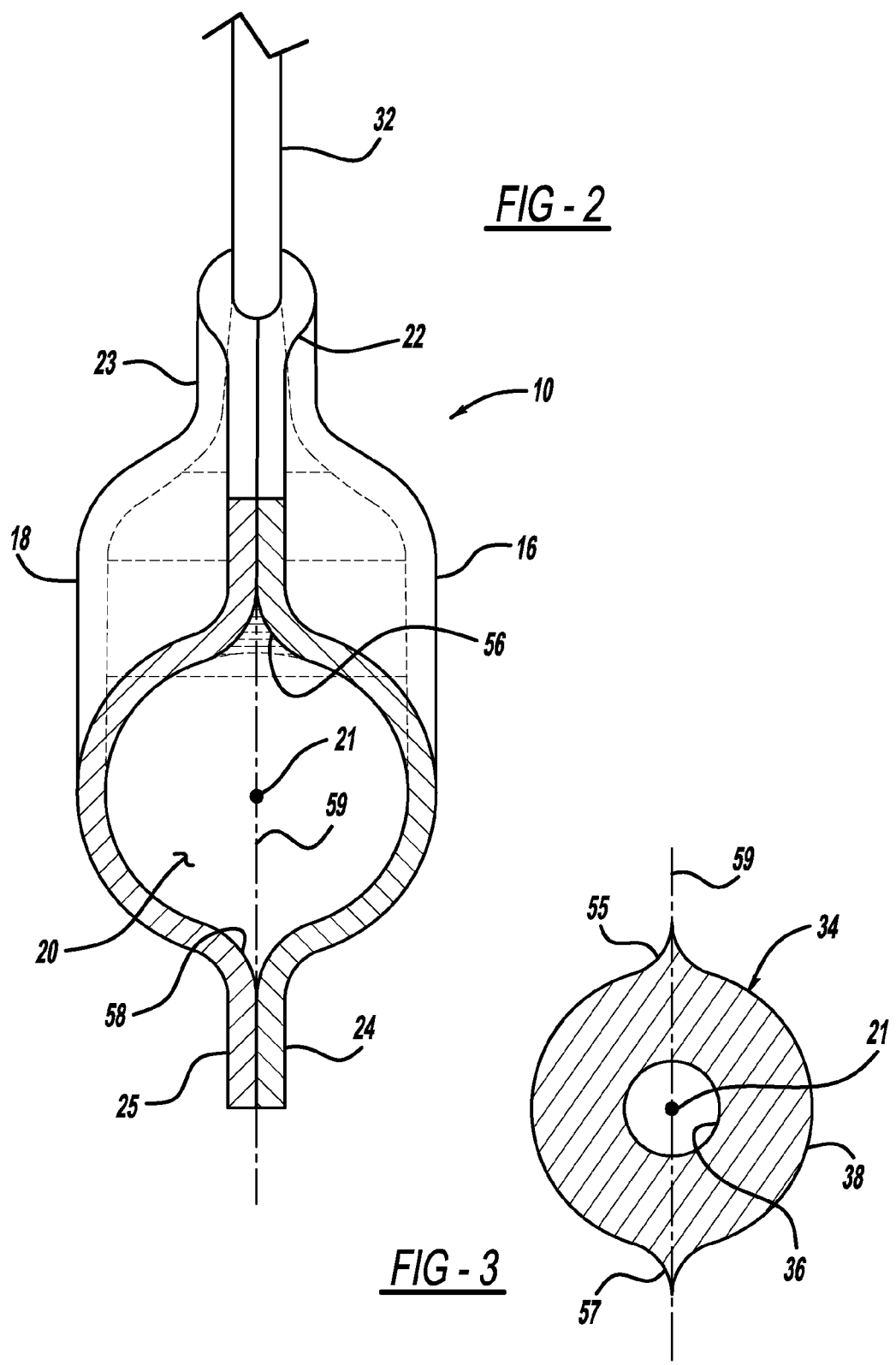

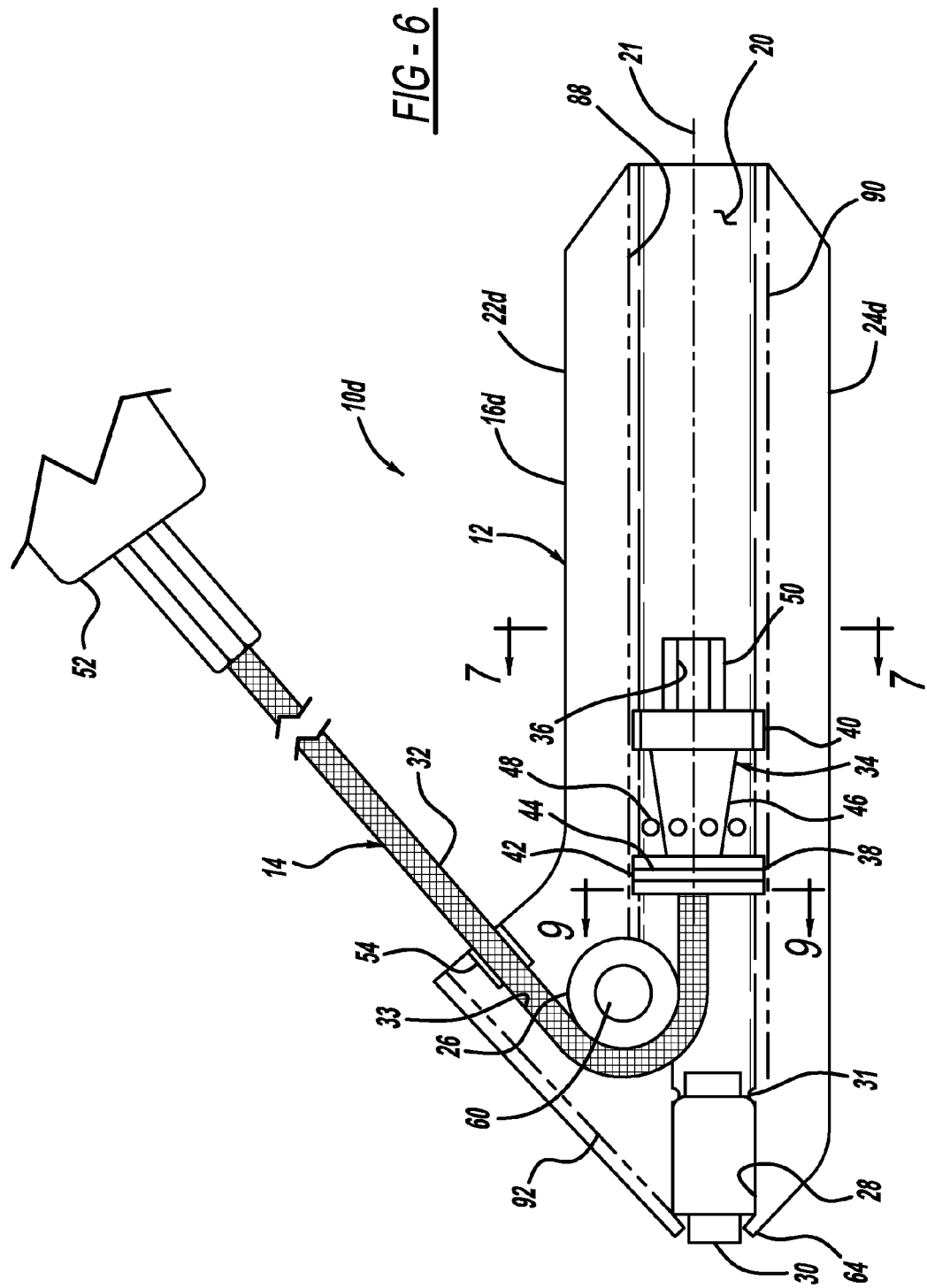

STAMPED HOUSING LINEAR PRETENSIONER

FIELD OF THE INVENTION

The present invention relates generally to seatbelt restraint systems for motor vehicles, and more particularly, to a seatbelt pretensioner for a seatbelt restraint system.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either prior to impact of the vehicle (also known as a "pre-pretensioner") or at an early stage of a sensed impact to enhance occupant restraint performance. The pretensioner takes out slack in the webbing and permits the belt restraint system to couple with the occupant early in the crash sequence. One class of pretensioning devices is a pyrotechnic linear pretensioner (PLP) which can be implemented as a pyrotechnic buckle pretensioner (PBP) which is attached to a seat belt buckle. PLPs can also be attached to a webbing guide loop or seatbelt anchorage. Since both types pull a seat belt system component linearly to apply tension in the belt webbing, both PLPs and PBPs can be collectively referred to as a PLP. Examples of designs of PLPs and PBPs are provided by U.S. Pat. No. 6,068,664, which is hereby incorporated by reference. When a collision occurs, a pyrotechnic charge of a PLP is fired, producing expanding gas which pressurizes a gas chamber within a tube, which forces a piston down the tube. The piston is connected with the belt system by a cable or strap. Stroking of the piston tightens or "pretensions" the belt against the occupant.

PLPs in accordance with present design approaches typically utilize a machined or die cast combustion chamber and a tubular piston cylinder formed of aluminum or steel. The parts are typically threaded or staked together. In addition, there are mounting features formed as part of the combustion chamber or stampings are fastened to the die cast combustion chamber. Although these devices operate satisfactorily, the requirement of die casting or machining of a solid metal blank results in a relatively heavy component and requires costly tooling and equipment for production. Designers of automotive components are constantly striving to reduce the mass of the components as part of the goal of providing higher fuel efficiency for motor vehicles. Moreover, cost is a primary consideration for automotive components.

SUMMARY OF THE INVENTION

This invention is a PLP which utilizes light weight steel stampings to replace a die cast or fabricated combustion chamber, mounting features, and piston cylinders of conventional designs. The stampings are simple to produce and assemble, providing a cost-effective design which results in a light weight component. Stamping processes are widely used in automotive component production and are well suited for cost-effective and high volume production with excellent quality control. The invention further relates to methods of assembly of the PLP having the aforementioned features.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 2 is a cross-sectional view taken transversely through an assembled pretensioner (showing both housing half members) in accordance with this invention taken along line 2-2 of FIG. 1;

FIG. 3 is a cross-sectional view taken transversely through the piston shown in FIG. 1 taken along line 3-3 of FIG. 1;

FIG. 6 is a side elevational view of a pretensioner in accordance with an alternate embodiment of this invention showing projection weld beads;

DETAILED DESCRIPTION OF INVENTION

Figure 1:
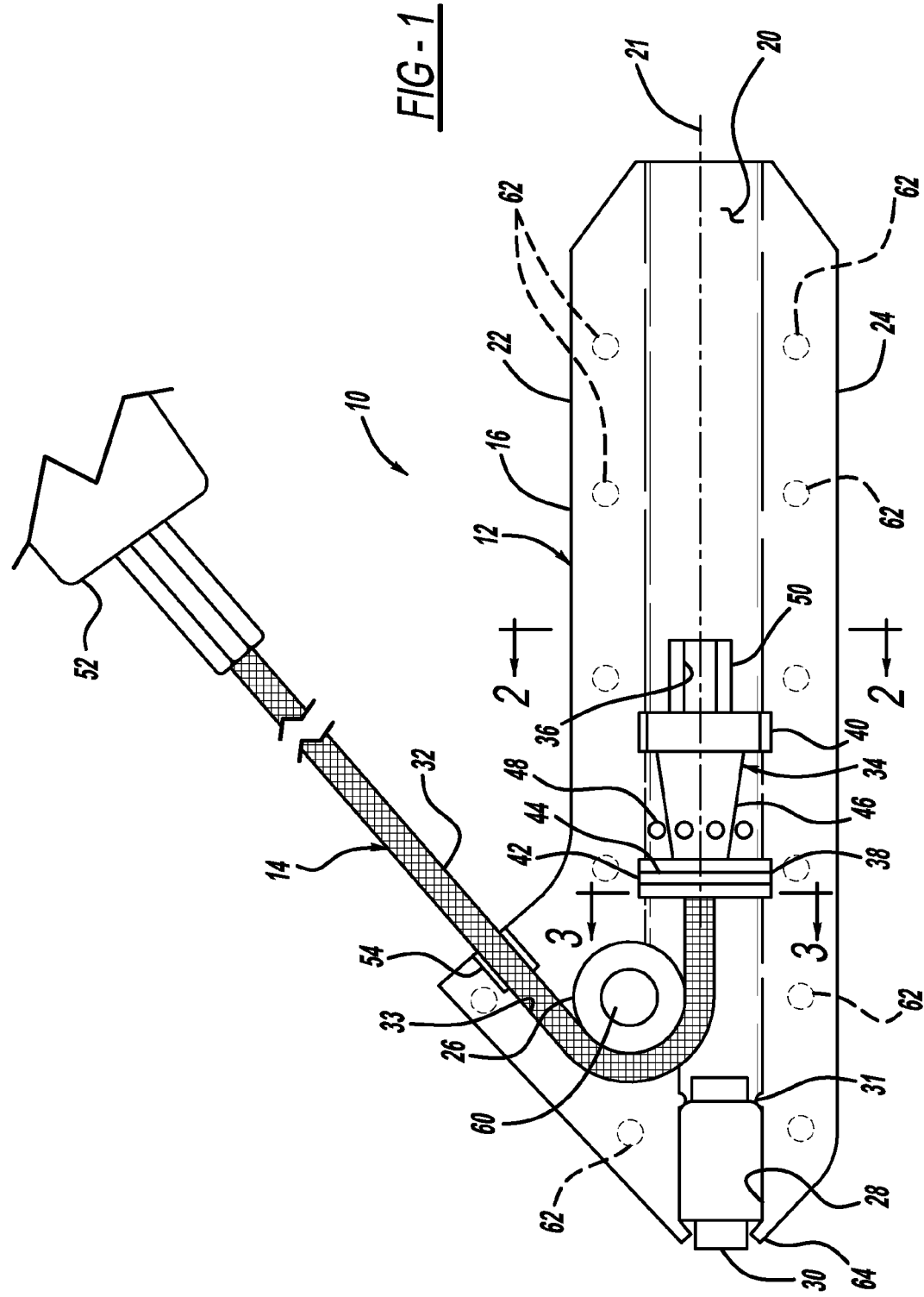
FIG. 1 is a side elevational view of the pretensioner in accordance with a first embodiment of this invention shown with one of the housing half members removed.
Figure 4:
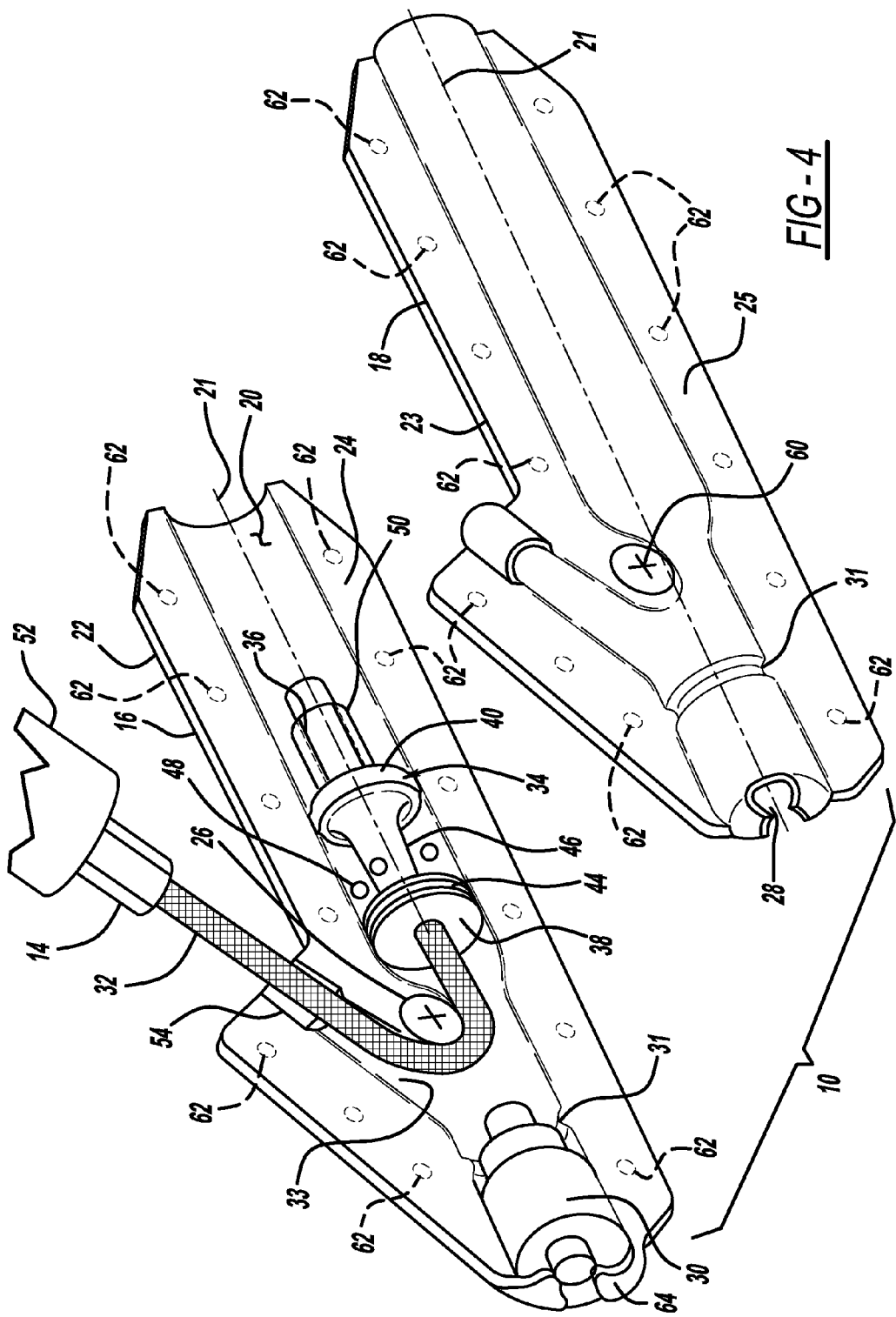
FIG. 4 is an exploded pictorial view of the pretensioner in accordance with a first embodiment of the present invention.

A linear pretensioner in accordance with the present invention is shown in FIGS. 1 through 4 and is generally designated by reference number 10. Referring specifically to FIGS. 1 and 4, the major sub-assemblies of the pretensioner 10 are shown, including housing 12, and piston and cable assembly 14.

In accordance with a principal feature of the present invention, housing 12 is primarily formed by a pair of housing half members 16 and 18. Housing half members 16 and 18 are formed from sheet stock, preferably by a stamping or a similar cold forming operation. Stamping processes generally use sheet stock of a uniform thickness, preferably steel for this application, which undergoes one or more stamping operations which form the desired configuration features. Blanking operations are part of stamping processes and are used to trim the perimeter of the parts, usually after the final part shape is formed. In order to permit the housing half members 16 and 18 to be formed by a stamping process, the parts are designed such that the surfaces of the parts can be formed by a stamping die which will release the part after the part is struck (i.e. no "die-lock" condition). This is provided by ensuring that no surface of housing half members 16 and 18 needs to be formed from a flat piece of sheet metal stock and deformed to past 90 degrees or normal to the plane that the stamping dies meet.

The housing half members 16 and 18 each form a semi-cylindrical portion of the piston bore 20, and each include respectively an upper attachment flange 22 and 23, and a lower attachment flange 24 and 25. The housing half members 16 and 18, when assembled to form housing 12, are joined at a joining plane 59 (the plane formed by the interface between flanges 22 and 23, and 24 and 25). The joining plane 59 shown in FIGS. 2 and 3 is generally parallel with and intersecting the piston bore 20. In the embodiment shown, the joining plane intersects the center axis 21 of bore 20.

A stationary pulley 26 is positioned between the housing half members 16 and 18 and performs a function which will be described below. Aligned with piston bore 20 is a mounting cavity 28 for a microgas generator 30, also formed by semi-cylindrical portions of the housing half members 16 and 18. Microgas generator 30 is of conventional design and is typically a small cylindrical component and is used to pyrotechnically produce an expanding gas in response to a firing signal on an electrical firing line (not shown). Microgas generator 30 is installed within cavity 28 and preferably the housing half members 16 and 18 form a projection or other feature which retains microgas generator 30 in position. For this purpose, rib 31 formed by housing half members 16 and 18 restricts the diameter of cavity 28 to trap microgas generator 30. Cavity 28 is open to piston bore 20 to permit generated gas to flow into the piston bore. Housing half flanges 22 and 23 cooperate to form a passageway 33 for pretensioner cable 32. Housing half members 16 and 18 may be made to be symmetrically identical to one another, which may simplify tooling development costs, even though the parts are not interchangeable (at least for the embodiments illustrated).

Piston 34 which is also shown by FIG. 3 is positioned within housing bore 20 and forms a central bore 36 for attaching and guiding cable 32. As shown, piston 34 includes a pair of ends or heads 38 and 40 which conform to the inside surface of housing bore 20. Head 38 forms an annular groove 42 which retains an elastomeric piston seal 44. Conical piston section 46 spans between piston heads 38 and 40. In accordance with known design features for pyrotechnic linear pretensioners, piston 34 is provided with means for preventing it from moving in a reverse direction after actuation. For this function, a series of balls 48 are loaded into position surrounding piston conical section 46. In the event that piston 34 is driven in the right-hand direction during actuation (as the system is shown in FIG. 1), forces urging the piston to move in the left-hand direction would cause balls 48 to become jammed or wedged between the surface of conical section 46 and the inside surface of piston bore 20. This acts as a "one-way clutch" preventing "backdriving" of pretensioner 10 after it is actuated. Cable retention tubular extension 50 enables cable 32 to be affixed to piston 34 by first passing cable 32 into the tubular extension, and then crimping or crushing the extension which deforms it to connect the parts. Sealing bushing 54 located around cable 32 is provided for gas sealing during pyrotechnic actuation.

Cable 32 is routed from piston 34, around stationary pulley 26, into passageway 33, and exits the assembly with its opposite end connected to buckle 52 (when implemented as a PBP) or another seat belt system component, such as a belt anchor or guide loop, depending on the desired vehicle application. As best shown in FIG. 2, since housing half members 16 and 18 are produced from sheet metal using a forming process such as stamping, there are limitations in the sharpness of corners and other features which can be readily formed. Certain challenges exist in providing sealing for piston bore 20 since the two housing half members 16 and 18 are joined together along a plane 59 which intersects piston bore 20. Accordingly, bore 20 is not ideally circular in cross-section. Rather, bore 20 forms a pair of "ears" 56 and 58, best shown in FIG. 2. In view of this cross-sectional configuration of bore 20, it may be desirable for some implementations of the invention to provide a corresponding shape for the piston heads 38 and 40, as shown by FIG. 3, where ears 55 and 57 are shown, with seal 44 being similarly shaped.

Stationary pulley 26 forms an outer perimeter groove for guiding cable 32. Pulley 26 is designed not to rotate in position, although modified designs could incorporate a pulley which rotates during actuation of pretensioner 10. Fastener 60 passes through a bore in stationary pulley 26 to maintain it in position. Fastener 60 could pass through bores in both housing half members 16 or 18, or other means could be used to stake pulley 26 in position.

In the assembly of the pretensioner, one housing half member 16 or 18 would be placed in a holding fixture. The stationary pulley 26 would be placed in position in the housing half member, and the piston and cable assembly 14 with buckle 50 (or other belt system component) attached to cable 32, and with the cable already crimped to piston 34. Cable 32 is routed around the stationary pulley 26 into passageway 33, and the piston 34 is placed into the housing member groove which forms one-half of piston bore 20. After the second housing half member 16 or 18 is placed in alignment with the first half with the respective flanges 22 and 23, and 24 and 25 overlapping, spot welds 62 (local electrical resistance welds) are formed through the flanges. FIGS. 1 and 4 show locations for a series of spot welds 62 (shown as dashed line circles). In the assembly process, stationary pulley 26 can act as an anti-compression device which helps to establish the position of the two housing half members 16 and 18. Once assembled, housing half members 16 and 18 form cavity 28 for microgas generator 30 which can be installed within the cavity. In a subsequent operation, after generator is inserted, the housing 12 can be crimped or staked to deform the material around cavity 28 to fix microgas generator 30 in position. Such a crimp is illustrated by the inwardly deflected flange 64 shown in FIGS. 1 and 4.

In order to permit the assembled linear pretensioner 10 to be mounted into a motor vehicle, the device can be provided with various types of mounting features. For example, bores or other features can be provided in flanges 22, 23, 24 and 25 to enable mounting to a vehicle.

When the motor vehicle occupant restraint system calls for actuation of the pretensioner 10, a firing signal is sent to microgas generator 30 which pyrotechnically generates a rapidly expanding gas which pressurizes piston bore 36. This forces piston 34 in the right-hand direction to stroke to near the end of piston bore 20. The length of cable 32 may be chosen such that piston 34 will not escape from the piston bore 20 after actuation, or other mechanical features can be provided to limit the maximum stroke of piston 34, such as restricting the diameter of piston bore 20 at the right-hand end or putting a bead or other feature along the length of cable 32. Forceable motion of piston 34 pulls cable 32 around stationary pulley 26 which pulls on seat belt buckle 52 or a seat belt system component such as a webbing guide loop, depending on the desired application. This action provides the pretensioning displacement for the belt system, desired for enhancing belt restraint system performance.

The advantages of the configuration assembly of pretensioner 10 are many. Principally, by forming housing half members 16 and 18 using stamped sheet metal parts, design changes and adaptations can be readily accomplished with relatively low cost investment in tooling and raw materials. Moreover, the linear pretensioner assembly 10 can be made light weight and compact in terms of packaging.

A number of additional design features may be incorporated for pretensioner 10 in accordance with alternate embodiments of the present invention. As mentioned previously, stationary pulley 26 can be made to rotate if desired. If there is a need to provide enhanced sealing of gas within piston bore 20, it would be possible to apply a layer of an elastomeric or plastic material, or other flowable sealing material on the inside of bore 20 which would fill in the "ear" areas 56 and 58 of the piston bore after half members 16 and 18 are fastened together, which is shown in dotted lines filling ear 56 in FIG. 2. After curing of the applied material, a reaming operation could be performed to produce a smooth cylindrical bore. In such case, a circular cross-section piston 34 could be used. The flowable sealing material or a gasket could also be used for providing a seal along the joining plane 59. However, a minor leakage path of gas from microgas generator 30, flowing into piston bore 20 and venting out between the assembled housing half members 16 and 18 may be acceptable without providing additional sealing features. Also, a piston 34 having a circular cross-sectional shape (i.e. cylindrical) could be used despite the leakage paths presented by ears 56 and 58 if adequate sealing is nonetheless present. Such a cylindrical piston would likely simplify producing the piston (e.g. by centerless grinding or a turning operation).

It is further possible to use joining processes for housing member 16 and 18 as alternatives to the spot welding process mentioned previously. For example, flanges 22 and 23, and 24 and 25 could be deformed after the two housing half members 16 and 18 are overlapped, such as by bending them over to form a folded flange or by locally deforming the components. It is also possible to use a bonding agent and process which does not require deformation of the flanges.

Figure 5A:
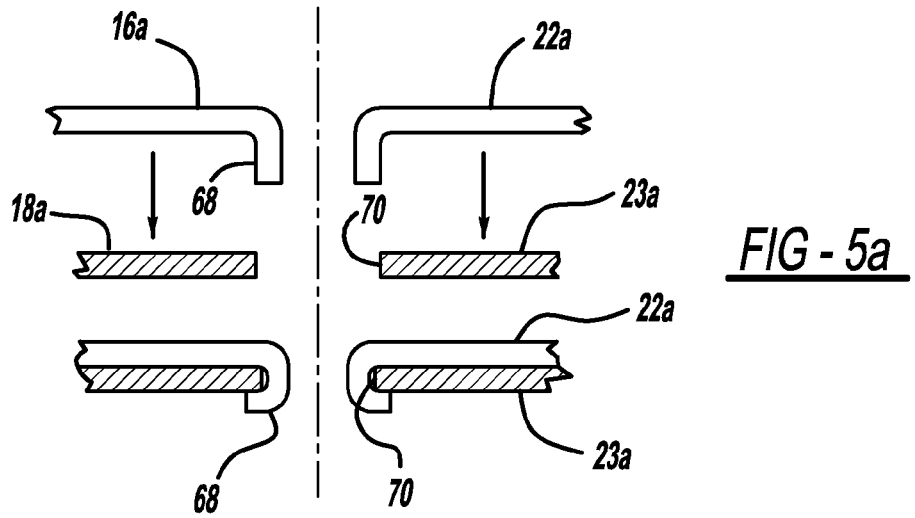
FIG. 5a illustrates an alternate embodiment for a mechanical fastening system for assembling the linear pretensioner utilizing an integral eyelet deformable element.

With specific reference to FIGS. 5a through 5d, cross-sectional view showing a number of mechanical fastening systems as mentioned previously. For these figures, elements corresponding to previously described elements are identified with "a" through "d" suffixes, respectively in the FIGS. 5a through 5d. FIG. 5a shows an attachment system for an embodiment of the present invention in which housing half section flange 23a forms a hole 70, with flange 22a forming a projecting integral eyelet 68 in the form of a rim or flange which is assembled into hole 70. FIG. 5a illustrates the parts 16a and 16b being connected by assembly in the direction of the arrow. Once the parts are nested, eyelet 68 is deformed as shown in the bottom sectional view of FIG. 5a. This deformation mechanically connects housing halves 16a and 18a. This fastening system employing corresponding holes 70 and eyelets 68 could be interspersed at various positions along the housing half flanges and could be, for example, placed in the positions illustrated for spot welds 62. This fastening system may be referred to as an "integral eyelet fastening system".

Figure 5B:
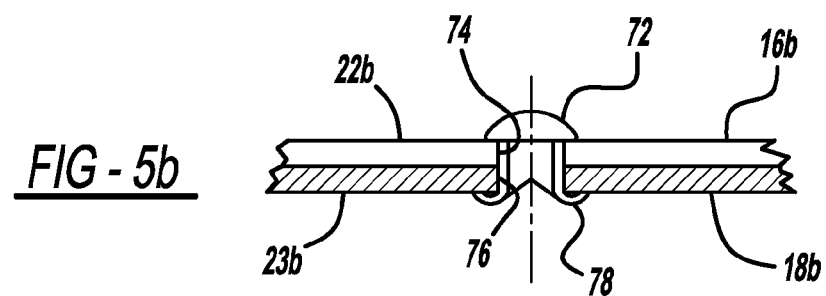
FIG. 5b is an alternate embodiment for assembling the linear pretensioner showing a rivet fastener for assembling the components.

FIG. 5b illustrates a modified mechanical attaching system in which housing half section 16b is fastened to housing half section 18b using a conventional tubular-type rivet 72 placed through housing flange holes 74 and 76. As known for conventional rivet attaching systems, rivet 72 incorporates a skirt 78 which is deformed to interlock the parts. As mentioned in connection with FIG. 5a, rivets 72 could be positioned about flanges 22b and 23b at positions presently shown for spot welds 62.

Figure 5C:
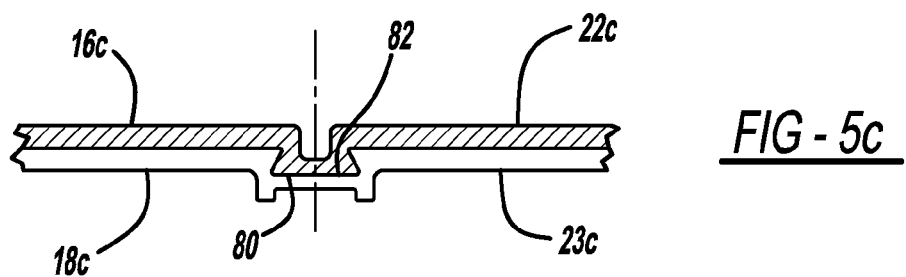
FIG. 5c shows an alternate method of assembling the components of the linear pretensioner in accordance with this invention using a toggle lock-type mechanical deformation fastening system.

FIG. 5c illustrates an alternate mechanical fastening system embodiment of the invention in which a so-called "toggle lock" system is employed. An example of such a mechanical fastening system is available from BTM Corporation under their trademark "Tog-L-Loc" product line. In the toggle lock system, housing half sections 16c and 18c are connected through forming a deformed head 80 interlock into a formed pocket 82 using appropriate deformation tools and processes. This fastening system may also be provided at localized positions about flanges 22 and 24 such as the positions indicated for spot weld 62.

Figure 5D:
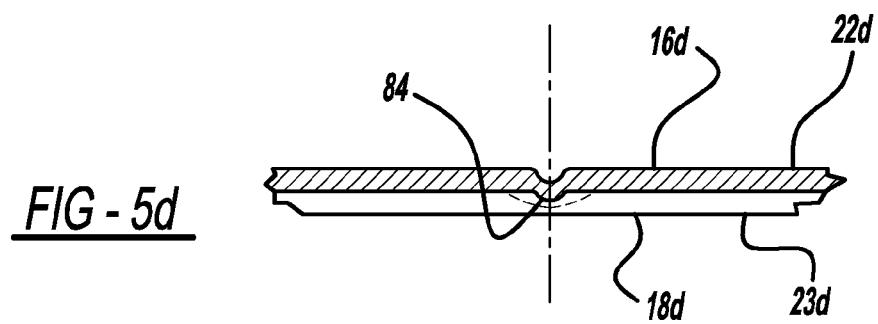
FIG. 5d shows an alternate method of assembling the components of the linear pretensioner in accordance with this invention using a projection weld fastening system.

FIG. 5d illustrates a projection weld fastening system in which bead 84 is provided in one of the housing half sections 16d or 18d. When the parts are assembled in a manner similar to spot welding, the contact between bead 84 and the corresponding surface of the other housing half 16d or 18d, provides a location for electrical conduction or other heating to cause the formation of a fusion bond or weld between the parts. Bead 84 may be in the form of a projecting circular post or may be formed as an elongated bead. Laser welding may also be used in which a beam of laser radiation is directed into bead 84.

Figure 7:
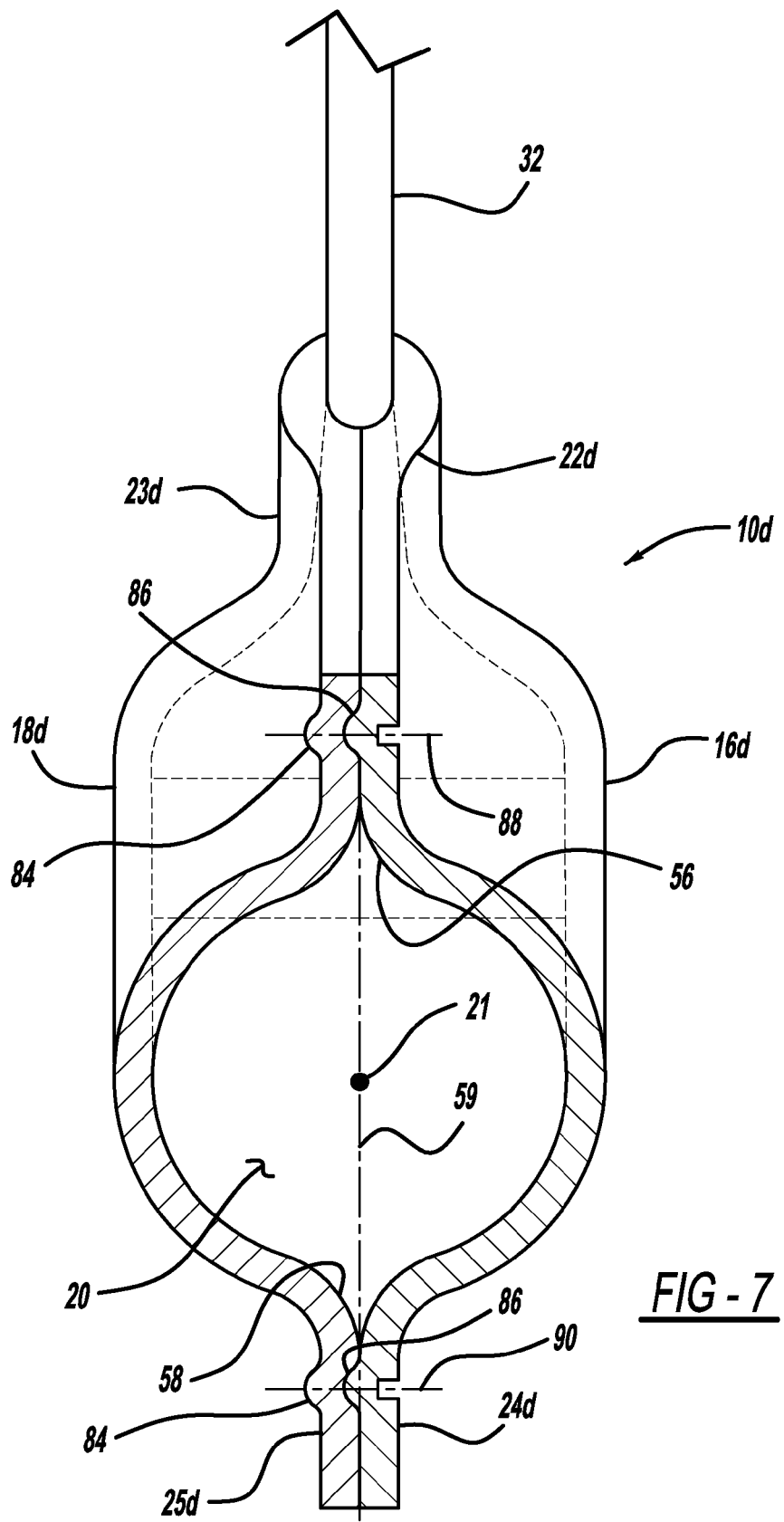
FIG. 7 is a cross-sectional view taken along line 7-7 of FIG. 6.

FIGS. 6 and 7 illustrate an alternate embodiment of the present invention of a linear pretensioner in accordance with the present invention designated as linear pretensioner 10d. Pretensioner 10d utilizes the projection weld approach described in connection with FIG. 5d. In this example, a pair of beads 84 and 86 is provided with one in housing half section 16d and the other on section 18d extending along bead lines 88, 90, and 92 shown in FIGS. 6 and 7. Beads 84 and 86 are formed to nest together, as shown in FIG. 7. One advantage of providing such a projection weld along the bead lines as indicated in FIG. 6, is the inherent sealing for piston bore 20 provided by such a fastening system. Since a continuous fusion bond is provided along flanges 22d and 23d, and flange 24d and its corresponding flange 25d, a gas seal is provided for restricting the escape of gasses from microgas generator 30 flowing into piston bore 20.

Figure 8:
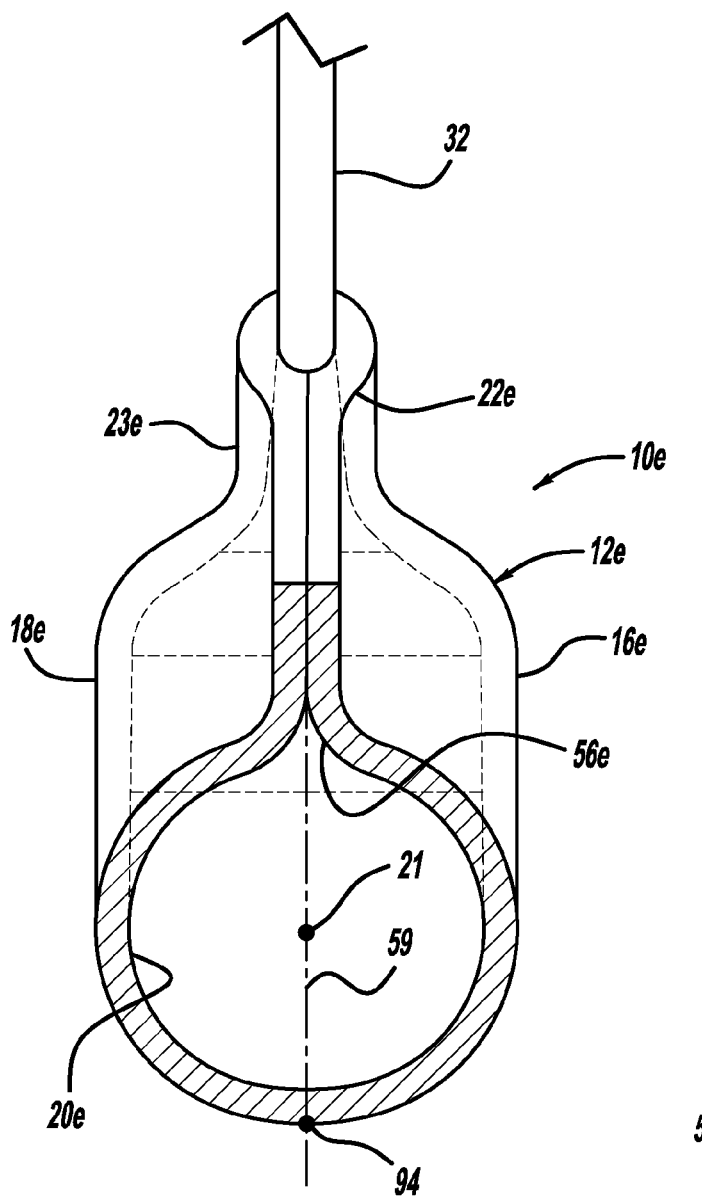
FIG. 8 is a cross-sectional view similar to that shown by FIG. 2 showing an alternate "clam shell" embodiment of the present invention.
Figure 9:
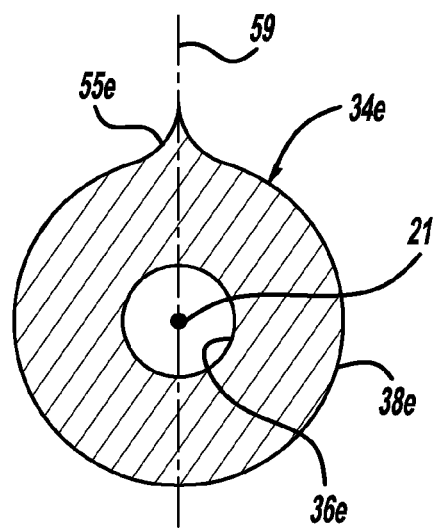
FIG. 9 is a cross-sectional view through a piston for use in connection with the embodiment shown in FIG. 8.

FIG. 8 illustrates a further alternate embodiment of the present invention designated as linear pretensioner 10e. In this embodiment, both housing half sections 16e and 18e (corresponding to housing half members of the prior embodiments) are integral and are formed by a single sheet of metal stock which after forming is deformed along folding line 94 in a "clam shell" manner and overlaps only at flanges 22e and 23e which are fastened together by any one of the many fastening systems previously described. An advantage of the embodiment of linear pretensioner 10e is that the entirety of housing 12e of the device can be formed from a single stamped sheet metal part, later deformed to the condition as illustrated in FIG. 8. It may be desirable to use a forming mandrel (not shown) around which the housing sections 16e and 18e are deformed to clamp together to accurately form piston bore 20e. For this embodiment, the piston bore 20e would form only a single ear 56e. Other piston configurations could be wed, as previously mentioned. An appropriately shaped piston 34e is illustrated in FIG. 9 including only a single projecting ear 55e. In other respects, pretensioner 10e is similar to those previously described in this specification.

While the above description constitutes the preferred embodiment of the present invention, it will be appreciated that the invention is susceptible to modification, variation, and change without departing from the proper scope and fair meaning of the accompanying claims.

The invention claimed is:

1. A pretensioner for use as part of a motor vehicle occupant belt restraint system of the type mountable to a motor vehicle structure and coupled with a belt restraint system component, and upon being activated, pulls the belt restraint component to pretension the belt restraint system, the pretensioner comprising:
a housing having a first housing half member and a second housing half member formed separately from the first housing half member, the first and second housing half members, when assembled, forming an elongated piston bore, the first and second housing half members joined together along a joining plane having a portion generally parallel with and intersecting the piston bore, wherein the first and second housing half members each form flanges which are matched together along the joining plane as the housing half members are joined,
a piston positioned in the piston bore,
a cable coupled with the piston and to the belt restraint component, and
a gas generator communicating with the piston bore which upon activation, drives the piston along the piston bore with the piston exerting tension on the cable.

2. The pretensioner in accordance with claim 1 further comprising a cable guide mounted to at least one of the housing half members for guiding the cable.

3. The pretensioner in accordance with claim 2 wherein the cable guide comprising a pulley positioned between the first and second housing half members with the cable routed to wrap around the pulley.

4. The pretensioner in accordance with claim 1 wherein the piston bore forms a cross-sectional shape which is generally circular with a pair of ears formed at the joining plane and wherein the piston has a cross-sectional shape which corresponds with the piston bore shape.

5. A pretensioner for use as part of a motor vehicle occupant belt restraint system of the type mountable to a motor vehicle structure and coupled with a belt restraint system component, and upon being activated, pulls the belt restraint component to pretension the belt restraint system, the pretensioner comprising:
a housing having a first housing half member and a second housing half member formed separately from the first housing half member, the first and second housing half members, when assembled, forming an elongated piston bore, the first and second housing half members joined together along a joining plane having a portion generally parallel with and intersecting the central axis of the piston bore,
a piston positioned in the piston bore,
a cable coupled with the piston and to the belt restraint component, and
a gas generator communicating with the piston bore which upon activation, drives the piston along the piston bore with the piston exerting tension on the cable.

6. The pretensioner in accordance with claim 1 wherein the first and second housing half members further forming a cable passageway for guiding the cable from the piston, though the piston bore, and exiting the housing half members.

7. The pretensioner in accordance with claim 1 wherein the first and second housing half members are joined by spot welding though the flanges.

8. A pretensioner for use as part of a motor vehicle occupant belt restraint system of the type mountable to a motor vehicle structure and coupled with a belt restraint system component, and upon being activated, pulls the belt restraint component to pretension the belt restraint system, the pretensioner comprising:
a housing having a first housing half member and a second housing half member formed separately from the first housing half member, the first and second housing half members, when assembled, forming an elongated piston bore, the first and second housing half members joined together along a joining plane having a portion generally parallel with and intersecting the piston bore a piston positioned in the piston bore,
a piston positioned in the piston bore,
a cable coupled with the piston and to the belt restraint component, and
a gas generator communicating with the piston bore which upon activation, drives the piston along the piston bore with the piston exerting tension on the cable, wherein the first and second housing members form a cavity to retain the gas generator.

9. The pretensioner in accordance with claim 8 wherein the first and second housing members each from a semi-cylindrical groove which cooperate to form the cavity to retain the gas generator.

10. The pretensioner in accordance with claim 8 wherein the cavity to retain the gas generator communicates with the piston bore and is generally coaxially aligned with the piston bore.

11. The pretensioner in accordance with claim 1 wherein the first and second housing half members are formed of sheet metal stock.

12. The pretensioner in accordance with claim 11 wherein the flanges being joined by deformation of at least one of the flanges.

13. The pretensioner in accordance with claim 12 wherein the flange of one of the housing half members forms a projecting eyelet and the flange of the other of the housing half members forms a hole which receives the projecting eyelet which is deformed to interlock the flanges together.

14. The pretensioner in accordance with claim 12 wherein the flanges are deformed using toggle lock deformation.

15. The pretensioner in accordance with claim 1 wherein the first and second housing half members are formed of sheet metal stock, the flanges forming holes which receive a rivet which is installed through the holes and is deformed to fasten together the flanges.

16. A pretensioner for use as part of a motor vehicle occupant belt restraint system of the type mountable to a motor vehicle structure and coupled with a belt restraint system component, and upon being activated, pulls the belt restraint component to pretension the belt restraint system, the pretensioner comprising:
a housing having a first housing half member and a second housing half member formed separately from the first housing half member, the first and second housing half members, when assembled, forming an elongated piston bore, the first and second housing half members joined together along a joining plane having a portion generally parallel with and intersecting the piston bore, the first and second housing half members are formed of sheet metal stock wherein the first and second housing half members each form flanges which are matched together along the joining plane as the housing half members are joined, the flange of at least one of the housing half members forming a projection for enabling a projection weld with the flange of the other of the housing half members to connect the flanges together, a piston positioned in the piston bore, a cable coupled with the piston and to the belt restraint component, and a gas generator communicating with the piston bore which upon activation, drives the piston along the piston bore with the piston exerting tension on the cable.

17. A pretensioner for use as part of a motor vehicle occupant belt restraint system of the type mountable to a motor vehicle structure and coupled with a belt restraint system component, and upon being activated, pulls the belt restraint component to pretension the belt restraint system, the pretensioner comprising:

a housing having a first housing half member and a second housing half member formed separately from the first housing half member, the first and second housing half members, when assembled, forming an elongated piston bore, the first and second housing half members joined together along a joining plane having a portion generally parallel with and intersecting the piston bore, wherein the first and second housing half members are formed of sheet metal stock wherein the first and second housing half members each form flanges which are matched together along the joining plane as the housing half members are joined, the flange of one of the housing half members forming a first projection along a first line adjacent to the piston bore and a second projection along a second line adjacent the bore with the bore being between the first and second projections for enabling the flanges to seal the piston bore, a piston positioned in the piston bore, a cable coupled with the piston and to the belt restraint component, and a gas generator communicating with the piston bore which upon activation, drives the piston along the piston bore with the piston exerting tension on the cable.

18. A pretensioner for use as part of a motor vehicle occupant belt restraint system of the type mountable to a motor vehicle structure and coupled with a belt restraint system component, and upon being activated, pulls the belt restraint component to pretension the belt restraint system, the pretensioner comprising:

a housing member formed from sheet metal stock, the housing member forming first and second housing half sections joined together at a folding line and forming a pair of flanges, wherein the housing member is folded along the folding line to match the flanges together, forming an elongated piston bore and a gas generator cavity communicating with the piston bore, the overlapping flanges joining along a joining plane having a portion generally parallel with and intersecting the piston bore, a piston positioned in the piston bore, a cable coupled with the piston and to the belt restraint component, and a gas generator positioned in the gas generator cavity and communicating with the piston bore which upon activation, drives the piston along the piston bore with the piston exerting tension on the cable.

19. The pretensioner in accordance with claim 18 further comprising a cable guide mounted to the housing member for guiding the cable.

20. The pretensioner in accordance with claim 19 wherein the cable guide comprising a pulley positioned between the first and second housing half sections with the cable routed to wrap around the pulley.

21. The pretensioner in accordance with claim 18 wherein the piston bore forms a cross-sectional shape which is generally circular with an ear formed at the joining plane adjacent the flanges and wherein the piston has a cross-sectional shape which corresponds with the piston bore shape.

22. The pretensioner in accordance with claim 18 wherein the joining plane intersecting the central axis of the piston bore.

23. The pretensioner in accordance with claim 18 wherein the first and second housing half sections further forming a cable passageway for guiding the cable from the piston, though the piston bore, and exiting the housing half sections.

24. The pretensioner in accordance with claim 18 wherein the first and second housing half sections are joined by spot welding through the flanges.

25. The pretensioner in accordance with claim 18 wherein the first and second housing sections each from a semi-cylindrical groove which cooperate to form the gas generator cavity.

26. The pretensioner in accordance with claim 18 wherein the gas generator cavity to retain the gas generator communicates with the piston bore and is generally coaxially aligned with the piston bore.

27. The pretensioner in accordance with claim 18 wherein the flanges are matched together along the joining plane as the housing half sections are joined and the flanges being joined by deformation of at least one of the flanges.

28. The pretensioner in accordance with claim 27 wherein the flange of one of the housing half sections forms a projecting eyelet and the flange of the other of the housing half sections forms a hole which receives the projecting eyelet which is deformed to interlock the flanges together.

29. The pretensioner in accordance with claim 27 wherein the flanges are deformed using toggle lock deformation.

30. The pretensioner in accordance with claim 18 wherein the flanges forming holes which receive a rivet which is installed through the holes and is deformed to fasten together the flanges.

31. The pretensioner in accordance with claim 18 wherein the flanges are matched together along the joining plane as the housing half members are folded, the flange of at least one of the housing half sections forming a projection for enabling a projection weld with the flange of the other of the housing half sections connect the flanges together.

32. The pretensioner in accordance with claim 18 wherein the flange of one of the housing half sections forms a projection along a line adjacent to the piston bore for enabling the flanges to seal the piston bore.

33. A method of manufacturing a pretensioner for use as part of a motor vehicle occupant belt restraint system of the type mountable to a motor vehicle structure and coupled with a belt restraint component, and upon being activated, pulls the belt restraint component to pretension the belt restraint system, the method comprising the steps of:

forming a first housing half member having at least one flange from metal sheet stock, forming a second housing half member having at least one flange from metal sheet stock, assembling the first and second housing member to form a housing by joining them together by overlapping the flanges along a joining plane, the first and second housing half members cooperating to form an elongated piston bore and a gas generator cavity, the joining plane having a portion generally parallel with the piston bore, installing a piston within the elongated piston bore, and installing a gas generator in the gas generator cavity to provide a gas flow path which communicates with the piston cylinder.

34. The method of manufacturing a pretensioner in accordance with claim 33 wherein the step of joining the first and second housing half members is by spot welding the half members together through the flanges.

35. The method of manufacturing a pretensioner in accordance with claim 33 further comprising deforming at least one of the first and second housing half member flanges to retain the gas generator in position within the gas generator cavity.

36. The method of manufacturing a pretensioner in accordance with claim 33 further comprising applying a flowable sealing material to the inside of the piston bore to seal the piston bore along the joining plane.

37. The method of manufacturing a pretensioner in accordance with claim 33 further comprising forming a cable guide and mounting the cable guide to at least one of the housing half members for guiding the cable.

38. The method of manufacturing a pretensioner in accordance with claim 33 further comprises providing a pulley and positioning the pulley between the first and second housing half members with the cable routed to wrap around the pulley.

39. The method of manufacturing a pretensioner in accordance with claim 33 wherein the joining plane intersecting the central axis of the piston bore.

40. The method of manufacturing a pretensioner in accordance with claim 33 wherein the first and second housing half members further forming a cable passageway for guiding the cable from the piston, though the piston bore, and exiting the housing half members.

41. The method of manufacturing a pretensioner in accordance with claim 33 wherein the first and second housing half members are joined by spot welding.

42. The method of manufacturing a pretensioner in accordance with claim 33 wherein the first and second housing half members flanges are matched together along the joining plane as the housing half members are joined.

43. The method of manufacturing a pretensioner in accordance with claim 33 further comprising forming the first and second housing members each to have a semi-cylindrical groove which cooperate to form the gas generator cavity.

44. The method of manufacturing a pretensioner in accordance with claim 33 wherein the cavity to retain the gas generator communicates with the piston bore and is generally coaxially aligned with the piston bore.

45. The method of manufacturing a pretensioner in accordance with claim 33 wherein the housing half members are joined and the flanges being joined by deformation of at least one of the flanges.

46. The method of manufacturing a pretensioner in accordance with claim 45 wherein the flange of one of the housing half members forms a projecting eyelet and the flange of the other of the housing half members forms a hole which receives the projecting eyelet which is deformed to interlock the flanges together.

47. The method of manufacturing a pretensioner in accordance with claim 45 wherein the flanges are deformed using toggle lock deformation.

48. The method of manufacturing a pretensioner in accordance with claim 33 wherein at least one of the first and second housing half member flanges forming holes which receive a rivet which is installed through the holes and is deformed to fasten together the flanges.

49. The method of manufacturing a pretensioner in accordance with claim 33 wherein the flange of one of the housing half members forms a projection for enabling a projection weld with the flange of the other of the housing half members to connect the flanges together.

50. The method of manufacturing a pretensioner in accordance with claim 33 wherein the flange of one of the housing half members forming a first projection along a line adjacent to the piston bore and a second projection along a line adjacent the bore with the bore being between the first and second projections for enabling the flanges to seal the piston bore.

51. A method of manufacturing a pretensioner for use as part of a motor vehicle occupant belt restraint system of the type mountable to a motor vehicle structure and coupled with a belt restraint component, and upon being activated, pulls the belt restraint component to pretension the belt restraint system, the method comprising the steps of:

forming a housing member having housing half sections joined together along a folding line having at least one flange from metal sheet stock extending from each of the half sections, folding the housing member by folding the housing member about the folding line and joining the flanges together along a joining plane, the first and second housing half sections cooperating to form an elongated piston bore and a gas generator cavity, the joining plane having a portion generally parallel with the piston bore, installing a piston within the elongated piston bore, and installing a gas generator in the gas generator cavity to provide a gas flow path which communicates with the piston cylinder.

* * * * *